No. 12,773. REISSUED MAR. 31, 1908.

N. McASLAN.

COMPOUND TOOL.

APPLICATION FILED NOV. 18, 1907.

Witnesses

C. M. Walker.

J. T. Walker.

Inventor

Norman McAslan.

By E. E. Vrooman, his Attorney.

THE NORRIS PETERS CO., WASHINGTON, D. C.

UNITED STATES PATENT OFFICE.

NORMAN McASLAN, OF YORKSHIRE, IOWA.

COMPOUND TOOL.

No. 12,773. Specification of Reissued Letters Patent. Reissued Mar. 31, 1908.

Original No. 858,618, dated July 2, 1907, Serial No. 364,441. Application for reissue filed November 18, 1907. Serial No. 403,101.

*To all whom it may concern:*

Be it known that I, NORMAN McASLAN, a citizen of the United States, residing at Yorkshire, in the county of Harrison and State of Iowa, have invented certain new and useful Improvements in Compound Tools, of which the following is a specification, reference being had therein to the accompanying drawing.

This invention relates to improvements in compound tools, and has for its object the construction of a compound tool, the handles of which are provided with integral jaws at their ends, means pivotally and slidably connecting the handles together near one end, and interlocking means adapted to hold the jaws at the opposite end together and prevent pivotal movement of the handles.

Another object of the invention is the provision of means for facilitating the supporting of tools upon handles of a compound tool.

A further object of the invention is the improvement of the construction of a compound tool of the plier-type, which is efficient and useful for a variety of purposes, and which tool is comparatively simple and inexpensive to construct, as well as durable.

With these and other objects in view, the invention consists of certain novel constructions, combinations, and arrangements of parts, as will be hereinafter fully described and claimed.

Figure 1:
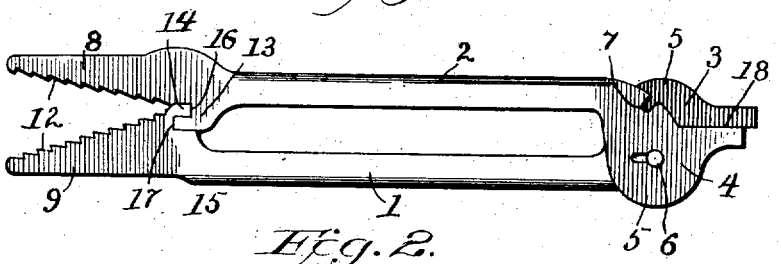
Figure 2:
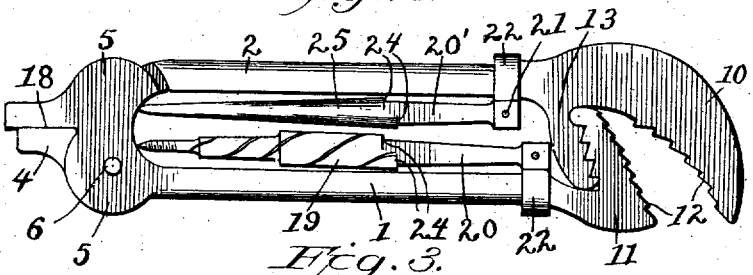
Figure 3:
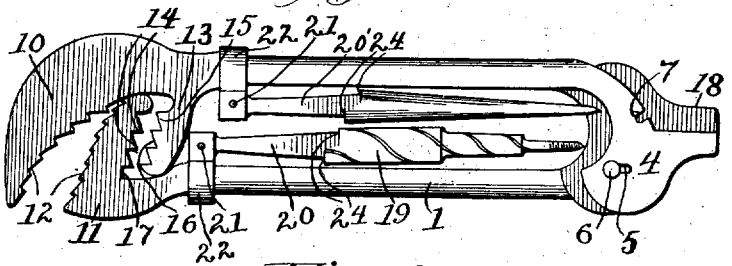
Figure 4:
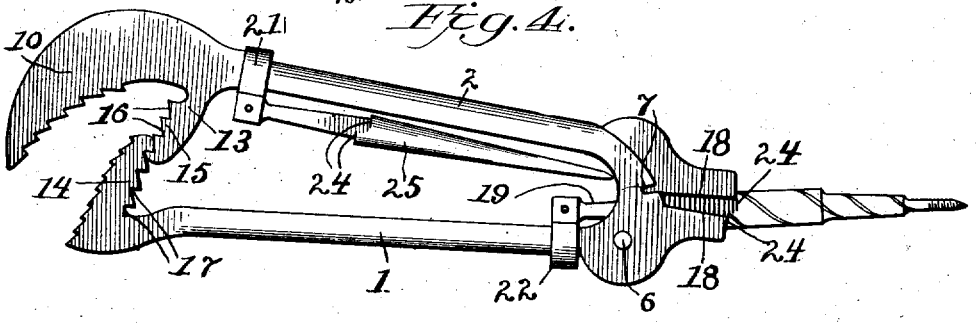
Figure 5:
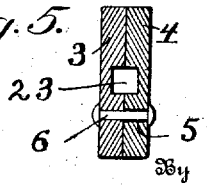

In the drawings: Figure 1 is a view in side elevation of a compound tool constructed in accordance with the present invention, the slidable tools being removed therefrom. Fig. 2 is a view in side elevation of a compound tool, showing another embodiment, upon the handles of which are mounted slidable tools. Fig. 3 is a view similar to Fig. 2, except the handles are arranged in position for use as a pair of pliers. Fig. 4 is a view in side elevation of a device constructed in accordance with the present invention, and showing the same arranged to form a handle for the auger or screw-driver mounted thereon. Fig. 5 is a cross-sectional view taken on line 5, 5, Figs. 1 and 2.

Referring to the drawings by numerals, 1 designates the primary handle, and 2 the auxiliary handle of the tool. Upon one and the same end of the handles 1 and 2, there are formed integral plier-jaws 3, and 4, respectively. The jaw 4 is provided with a horizontal or longitudinally-extending slot 5, and the jaw 3 is provided with a headed pin 6, extending through the slot 5 and pivotally and slidably connecting the plier-jaws together. Each jaw 4 is provided with a wire-cutting notch 7.

In Fig. 1, the handles 1 and 2 are provided at one end with integral, pipe-gripping or "alligator" jaws 8 and 9, whereas in Figs. 2 to 4, the pipe-gripping jaws 10 and 11 are positioned at an angle to the plane in which the handles 1 and 2 are formed. However, in both instances, the jaws 8 and 9 and 10 and 11 are provided with serrated or toothed surfaces 12 for gripping a pipe or an object placed between said jaws.

The jaws 8 and 10 are provided with a depending portion 13, and the jaws 9 and 11 are provided at their inner ends or upon their inner faces with a rearwardly-extending tooth or lug or lugs 14, which lugs interlock with similarly constructed lugs 15 formed upon the depending portions 13 of jaws 8 and 10.

It is to be noted that the laterally-extending teeth or lugs 14 fit into notches, sockets, or cut-out portions 16, forming the lugs or teeth 15 in the extension 13 and the lugs or teeth 15 fit into notches, recesses or cut-out portions 17 forming the teeth or lugs 14. When the parts are arranged in the position shown in Figs. 1 and 2, the tool is adapted to be used as a wrench.

When it is desired to use the tool as a plier, the handle 2, provided with the jaw 4, is slipped forwardly on the headed pin 6 to disengage the lug or lugs or teeth 15 from the lug or lugs 14, thereby releasing said handles to permit relative movement of the plier jaws.

It is to be noted that by means of the pin and longitudinally-extending slot 5, the jaws are permitted to have a pivotal movement, and also one of the jaws is permitted to slide longitudinally of the other jaw for disengaging or engaging the interlocking means forming an integral part of the pipe-gripping jaws; the interlocking means extending rearwardly from the pipe-gripping jaws and securing the handles in an adjusted or fastened position when said jaws are in their closest position, relative to the engaging or interlocking teeth or lugs.

By "closest position", I do not necessarily mean that the gripping surfaces of the jaws, which engage the pipe or object, must be closest together, but the closest relative position of the interlocking means for securing the handles against pivotal movement.

It will also be noted that the engagement of the lugs or teeth 14 and 15, carried by the jaws 10 and 11, serve as a means for holding or locking the plier-jaws in an open or closed position, without necessitating the operator gripping the handles 1 and 2.

In Figs. 2 to 4, the engaging and disengaging of the lugs or teeth 14 and 15 is permitted for changing the position of the gripping-faces or surfaces 12 of the jaws, and thereby change the distance between the gripping faces 12 of the pliers. Slidably mounted upon the handles 1, Figs. 2 to 4, is an auger or drill 19, said auger being formed with a plurality of different size working portions as shown, whereby holes of different diameters may be bored or drilled. The inner end of the auger 19 is provided with a flat or rectangular shank 20, which is pivotally connected, at 21, near its inner end, with a clip or sleeve 22. The clip or sleeve 22 embraces and is slidably connected with the handle, whereby the auger may be slipped downwardly or outwardly on the handle 1, and between the jaws 4 and 5, to an operative position, as shown in Fig. 4. The overlapping, pivoted portion of the jaws 4 and 5 are recessed or grooved, as at 23, Fig. 5, on their adjacent, inner faces to provide a passage, through which the auger 19 is projected. Between the inner ends of the auger and the shank 20, are formed shoulders 24, which, when the auger is in an operative position, are engaged by the outer ends of the plier-jaws, which securely grip the shank and are held in engagement therewith by the double tooth-connection or interlocking means 14 and 15 of the handles, thereby securely holding the auger in an operative position and providing a handle by which the same may be manipulated.

On the handle 2 is slidably mounted a screw-driver or other form of tool 25, which tool 25 is provided with a reduced, squared shank 20′. The reduced, squared shank 20′ is pivotally connected, at 21, to clip or sleeve 22, which clip or sleeve is slidably mounted upon the handle 2 to permit the screw-driver to be projected through the passage 23, between the plier-jaws, in position for use in the same manner as described in connection with the auger 19; the screw-driver 25 being provided with shoulders 24, which are engaged by the outer ends of the plier-jaws to hold the screw-driver in place.

The interlocking means carried by the gripping jaws 10 and 11 obviate the necessity of the operator exerting a gripping force upon the handles for holding the sliding tools 19 and 25 between the plier-jaws, whereas, in Fig. 1, if one of the tools 19 or 25 was positioned between the plier-jaws, the operator would have to grip the handles to hold the plier-jaws normally in engagement with the squared shank of the tool.

When it is desired to use the tool as a pair of pliers, the handle 2 is slipped inwardly to disengage the jaws 8 and 10 from the interlocking means, thus bringing the outer end of the plier jaws in alinement and permitting the handle to be swung apart to open the jaws to the desired extent.

From the foregoing description, it will be noted that I have provided a combined tool, composed of handles, each of which is provided at its ends with integral jaws, one a plier jaw and the other, preferably, a pipe-gripping jaw; integral, stationary means being carried by said jaws and handles intermediate their ends and adapted to interlock for holding said handles and jaws against pivotal movement.

It is to be noted that each handle is provided at its ends with jaws, the engaging or gripping surface of one jaw faces downwardly, whereas the engaging or gripping surface of the other jaw faces upwardly; each handle being provided with oppositely positioned jaws coöperating with the oppositely positioned jaws on the other handle. In other words, my peculiar compound tool comprises a plurality of handles, each of which is provided with oppositely positioned jaws coöperating with the oppositely positioned jaws integral with the other handle.

What I claim is:

1. In a device of the character described, the combination of a plurality of pivotally connected handles, each of which is provided with oppositely positioned, integral jaws at its ends coöperating with oppositely positioned jaws integral with the other handle, and said handles and some of the jaws provided with integral, interlocking means for securing said handles and jaws together against pivotal movement.

2. A compound tool, comprising a pair of handles, each handle formed from a single piece and provided at one end with a plier-jaw and at its opposite end with a pipe-gripping jaw, one handle pivotally connected to and slidably mounted upon the other handle, and integral means extending from one of the pipe-gripping jaws and interlocking with integral means extending from the other pipe-gripping jaw for locking the handles together when the pipe-gripping jaws are in their closest position.

3. A tool, comprising a pair of handles provided at one end with coöperating gripping jaws, a loose pivotal connection between the handles adapting them for relative longitudinal movement, and overlapping toothed projections provided near the end opposite to that carrying the jaws and designed for interlocking engagement to fix the jaws in gripping position.

4. A tool, comprising a pair of handles provided at one end with a pair of jaws, a depending portion provided with a tooth or lug extending from one handle contiguous to the rear end of one of the jaws, the other jaw provided with a socket or notch and with a rearwardly-extending tooth or lug adapted to interlock with the tooth or lug of the depending portion, the tooth or lug of the depending portion adapted to be positioned in the socket or notch.

5. A tool, comprising a pair of handles provided near one end with plier jaws, a pin and a slot formed upon said plier jaws and pivotally and slidably connecting said handles, said handles provided at their opposite ends with gripping jaws, integral, interlocking lugs or teeth projecting inwardly and carried by the handles contiguous to the last-mentioned jaws and adapted to prevent pivotal movement of said handles when said lugs and teeth are in engagement.

6. A tool, comprising a pair of pivotally-connected handles provided with coöperating gripping-jaws, and a pair of tools slidably engaged respectively with said handles and adapted to be projected one at a time forwardly between said jaws and held by the latter for operation.

7. A tool, comprising a pair of pivotally-connected handles provided with coöperating gripping-jaws, a pair of tools slidably engaged respectively with said handles and adapted to be projected one at a time forwardly between said jaws and held by the latter for operation, and interlocking devices provided on the handles for locking them in gripping position.

8. A tool, comprising a pair of handles provided at their forward ends with coöperating gripping jaws, a drill slidably engaged with one of the handles and having a plurality of working surfaces for boring holes of relatively different sizes, a second tool slidably engaged with the other handle, said tools being adapted to be projected one at a time forwardly between said jaws and held by the latter for operation, and means for locking the handles in gripping position.

In testimony whereof I hereunto affix my signature in the presence of two witnesses.

NORMAN McASLAN.

Witnesses:
ROBERT IVENS,
JAMES G. CAVE.